Oct. 28, 1969     P. A. G. LEPELLETIER     3,474,690

TRANSMISSION ESPECIALLY FOR AUTOMOBILE VEHICLE

Filed April 26, 1967     4 Sheets-Sheet 1

INVENTOR
PIERRE ANDRÉ
    GEORGES LEPELLETIER
BY Young + Thompson
            ATTYS.

Oct. 28, 1969          P. A. G. LEPELLETIER          3,474,690
TRANSMISSION ESPECIALLY FOR AUTOMOBILE VEHICLE
Filed April 26, 1967                                    4 Sheets-Sheet 2
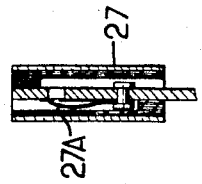
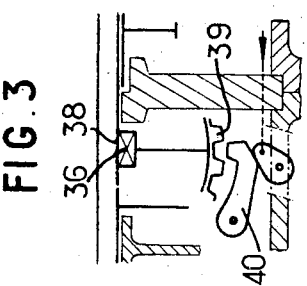
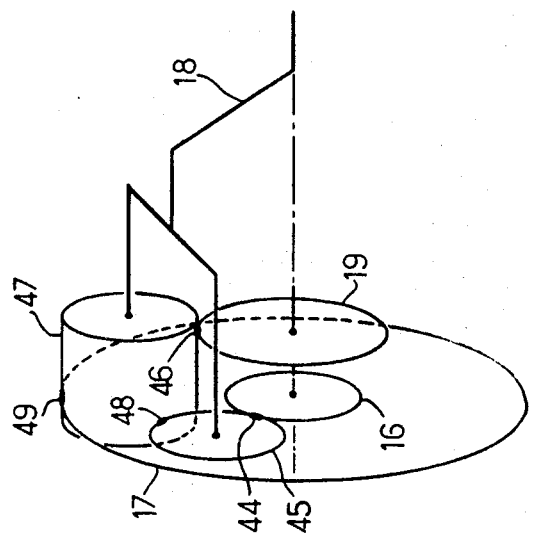
INVENTOR
PIERRE ANDRÉ GEORGES
              LEPELLETIER
By Young + Thompson
              ATTYS.

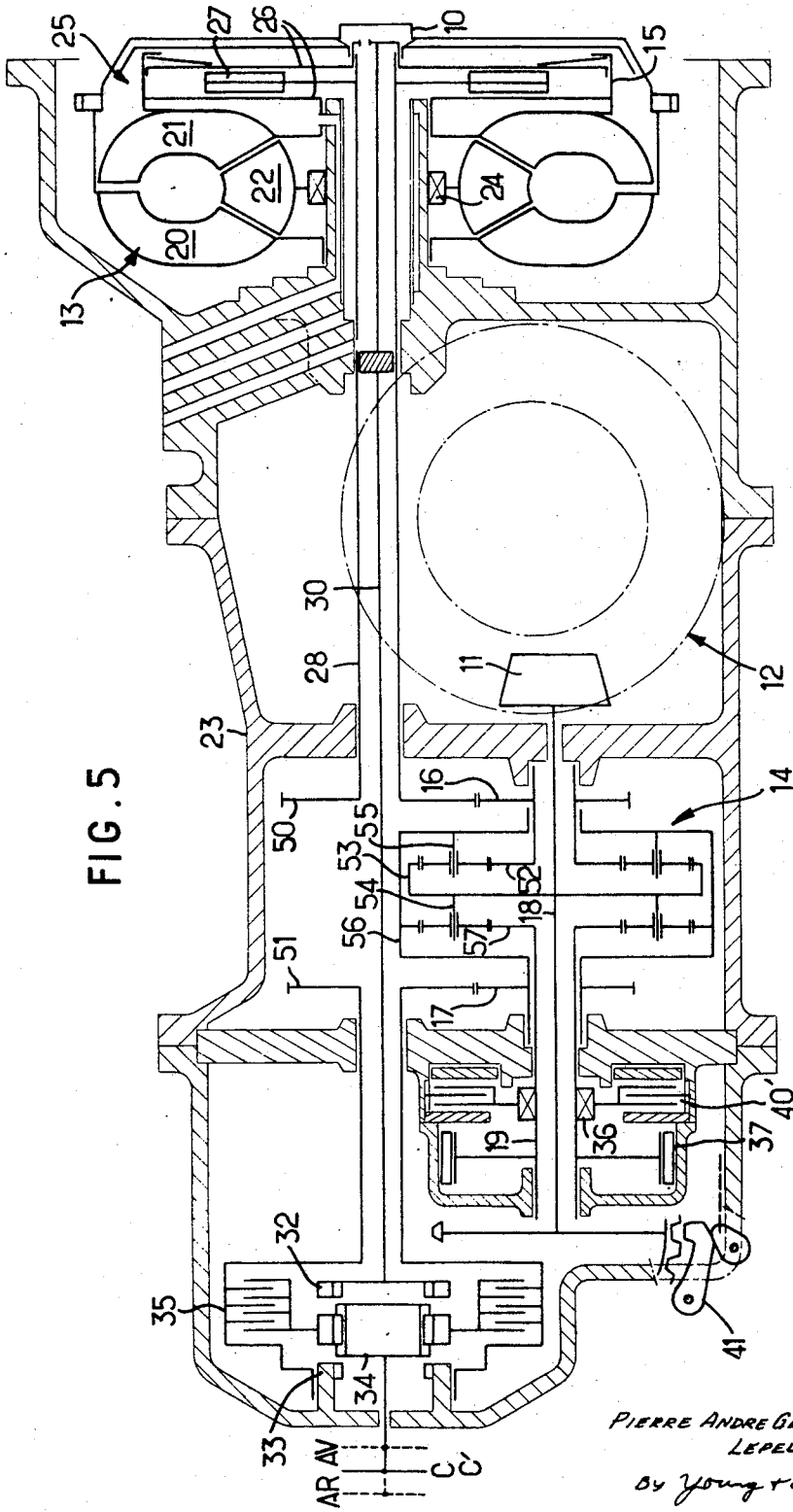

United States Patent Office 3,474,690
Patented Oct. 28, 1969

3,474,690
TRANSMISSION ESPECIALLY FOR AUTOMOBILE VEHICLE
Pierre André Georges Lepelletier, Chatou, Yvelines, France, assignor to Societe Anonyme Francaise du Ferodo, Paris, France, a corporation of France
Filed Apr. 26, 1967, Ser. No. 633,881
Claims priority, application France, May 4, 1966, 60,191
Int. Cl. F16h *47/08, 57/10, 37/08*
U.S. Cl. 74—732        12 Claims

ABSTRACT OF THE DISCLOSURE

A mechanical transmission comprising a kinetic coupling device (coupler, torque converter, automatic clutch, etc.) and a gear-box of the type having three forward gears and one reverse gear and provided with four elements coupled together by planetary gears: a releasable input element, a second input element, an output element and a releasable reaction element, the latter element co-operating with means for immobilizing said element on the first and second forward gears, said means comprising a free-wheel device and a force-limiting device fast with or free with respect to the frame, said free-wheel having one of its two portions coupled to said reaction element and its other portion associated with a locking member so as to form a lock on the first and second forward gears, in the forward direction of transmission of the torque when the locking member is operative, while the force-limiting device provides a limited friction engagement for the reverse direction of transmission of the torque.

---

The present invention relates to a transmission system, especially for automobile vehicles, comprising, between the engine and the driving wheels on the one hand, and a kinetic coupling apparatus of the kind which is partly or wholly disconnected during slow-running, for example an apparatus responsive to centrifugal force (coupler or hydraulic torque converter, automatic clutch, etc.), and on the other hand a gear-box with two inputs, in association with a movement take-off from the said kinetic coupling apparatus (in the case where the kinetic coupling apparatus is a coupler or a hydraulic torque converter, the above-mentioned movement take-off is formed by the turbine of the coupler or of the converter) and the output of which drives the driving wheels, the said gear-box being of the type comprising four elements which are coupled to each other by gear means of the planetary type and which co-operate, both with coupling means which can be disengaged from the said movement take-off, and with releasable immobilizing means, a first of the said elements, known as the releasable input element, being adapted for driving by the said movement take-off through the intermediary of a first clutch, or to be immobilized, or to be free, a third of the said elements, known as the output element, being coupled to the driving wheels, the fourth of the said elements, known as the releasable reaction element, being adapted to be either immobilized, or free, the gear-box being provided with three forward running speeds and a reverse speed, whereby: in the first forward running speed gear, the first element is driven by the movement take-off, the second element is free, and the fourth element is immobilized; in the second forward-running gear position, the first element is free, the second element is driven by the movement take-off, and the fourth element is immobilized; in the third forward-running gear position (forming a double drive from the planetary gear means) the first element is driven by the movement take-off, the second element is driven by the movement take-off and the fourth element is free, while in the reverse-running position, the first element is driven by the movement take-off, the second element is immobilized and the fourth element is free.

The known transmissions of this kind or of a similar kind, have generally a complicated and expensive construction, comprising, depending on the case, two or three clutches, two brake bands or clutches, and one or two free wheels.

The present invention has for its object a transmission system, especially for an automobile vehicle, the construction of which is definitely simplified as compared with the known transmissions, while at the same time having equivalent or superior performances, especially from the point of view of general efficiency and simplicity of the controls.

According to the invention, the fourth element, known as the releasable reaction element, co-operates with immobilization means which are adapted to immobilize it either in the first or second forward-running speeds, and which are therefore common to these two gears, the said immobilizing means comprising on the one hand a free wheel and on the other hand a calibrated force limiter engageable and releasable with respect to the frame, the said free wheel having one of its two portions coupled to the said fourth element, while its other portion is associated with a locking member so that the said free wheel forms a lock on the first and second forward gears in the direction of passage of the torque forwards, while the said member is made operative, whereas the said force-limiting device completes the free wheel by ensuring a limited gripping action in the reverse direction of passage of the torque.

The locking member of the free wheel is preferably designed to comply with the following conditions:

(1) It is in action once and for all, for all the forward gears, and is inoperative for the reverse gear and in the neutral position.

(2) It is actuated when the vehicle is at rest.

(3) It acts fully or not at all, without variation of the gripping effect and the release, without thereby involving either failure to operate or untimely shocks.

In some forms of construction, the locking member of the free wheel is a brake, for example hydraulic, or alternatively a mechanical finger, for example with a knuckle-joint or with pressure or the like.

According to a further characteristic feature, the second element, known as the mixed element, co-operates by means of the second clutch both with the movement take-off of the coupling device in order to engage the second and third forward gears and with immobilizing means on the fixed frame in order to engage the reverse gear.

These immobilizing means are preferably designed to comply with the following conditions:

(1) They are in operation for the reverse gear and are out of action once and for all, for all the forward speeds and for the neutral position.

(2) They are actuated when the vehicle is stationary.

(3) They act fully or not at all, without varying the gripping effect and the release, and without thereby causing either failure to operate or untimely shocks.

In one form of construction, the main inertia element of the second clutch is keyed on the mixed element, the immobilizing means of which then comprise a double dog-clutch, of which one of the sets of teeth, called the forward-running teeth, is coupled to the said movement take-off of the coupling device, the other set of teeth, known as the reversing teeth, being coupled to the frame, and having its sliding-gear coupled to the low inertia element of the said second clutch.

In the neutral position, the two clutches are disengaged and the force-limiting device is engaged while the brake associated with the free wheel is released and the double dog-clutch is freed from its teeth. When the locking member associated with the free-wheel is not a brake but is a mechanical finger, this latter is also disengaged from its corresponding set of teeth.

When the vehicle is stationary, the various elements of the gear-box are immobilized on the third element coupled to the driving wheels and on the fourth element subjected to the gripping effect of the force-limiting device, and the two parts of the free-wheel are stopped, together with the sliding gear of the double dog-clutch, for the twofold reason of the low inertia of these parts and of the absence of any positive action tending to drive them.

On the other hand, depending on whether the kinetic coupling device is partly or wholly disengaged, the forward-running teeth coupled to the movement take-off may either continue to rotate or they may also be stationary. In the text which follows, the first of these two possibilities will be more particularly considered, in which the movement take-off continues to rotate, which is the case when the coupling device has a residual torque known as the drag torque.

When leaving the neutral position, and before any movement of mechanical engagement of the dog-clutch, the first clutch is engaged. The movement take-off is thereby immobilized together with the forward-running teeth of the double dog-clutch, supported simultaneously on the driving wheels and on the force-limiting device which has the function of a drag brake.

As the sliding gear is keyed on the low inertia element of the second clutch, which is still disengaged, and the two elements of which are stationary or moving slowly in the event of slip in the force-limiting device, there is no resulting difficulty of passage either in the engagement or the disengagement of the dog-clutch, and this is the case both for forward running and reverse running, whether the clutch is of the dry type or of the oil type, even at very cold temperatures.

The part of the free-wheel to be locked, also of low inertia, is either stationary or rotating slowly in the event of slip of the limiting device, and the brake or finger associated with the said free-wheel can for its part be easily operated for the purpose of its engagement or disengagement, whether there is a load or not during one of these operations.

Satisfactory operation is thus obtained with constructional members which are light and small in number.

In a preferred arrangement, the order in which the various parts of the transmission are mounted is as follows: kinetic device, free-wheel assembly, locking member and force-limiting device, gear-box, second clutch, double dog-clutch.

In one form of construction, the kinetic device is a hydraulic torque converter and the first clutch is mounted in juxtaposition to the turbine of the said converter, inside a chamber which is filled with oil and which contains the said converter.

Between the gear-box and the driving wheels of the vehicle, the transmission advantageously comprises a bevel-gear system forming an axle which is placed axially between the kinetic apparatus and the gear-box.

The third element of the gear-box, known as the output element, is preferably associated with a locking or parking device which is employed for immobilizing the vehicle when at rest.

It will be noted that although there is only one free-wheel, this plays a favourable part during all changes of gear, both between first and second gears and between second and third, and thus provides, in combination with the force-limiting device, an appreciable range of tolerances in the operation of the two clutches and the brake.

It will be appreciated that the transmission permits the use of the engine brake at all speeds in forward running and reverse, especially in the first and second gears, by virtue of the force-limiting device, the calibration of which is chosen to be sufficient for the transmission of the torque in reverse, and in third gear by virtue of the double drive by the movement take-off.

The force-limiting device has the additional effect of absorbing the shocks which would be liable to occur when engaging the first forward gear or the reverse gear when the vehicle is stationary, and also to permit the engine to be started by pushing the vehicle with the gear-box in neutral, this operation being accompanied by the automatic disengagement of the transmission as soon as the engine starts-up, which is a highly desirable condition of safety. The starting-up of the engine can furthermore also be effected with a gear engaged so as to permit the vehicle to be immediately driven by the engine if the user considers it preferable to operate in this manner without committing any imprudent action.

The objects, characteristic features and advantages of the invention will further be brought out in the description which follows below of forms of construction chosen by way of example, reference being made to the accompanying drawings, in which:

FIG. 2 is a perspective diagram illustrating the planetary gear means of the gear-box of the transmission shown in FIG. 1;

FIG. 3 shows a form of construction of a locking finger associated with the free-wheel of FIG. 1;

FIG. 4 is a detail view in cross-section and to a larger scale of the friction disc of the clutch arranged at the right-hand extremity of FIG. 1;

FIG. 5 is a view similar to FIG. 1, but concerns an alternative form of transmission;

Figure 1:
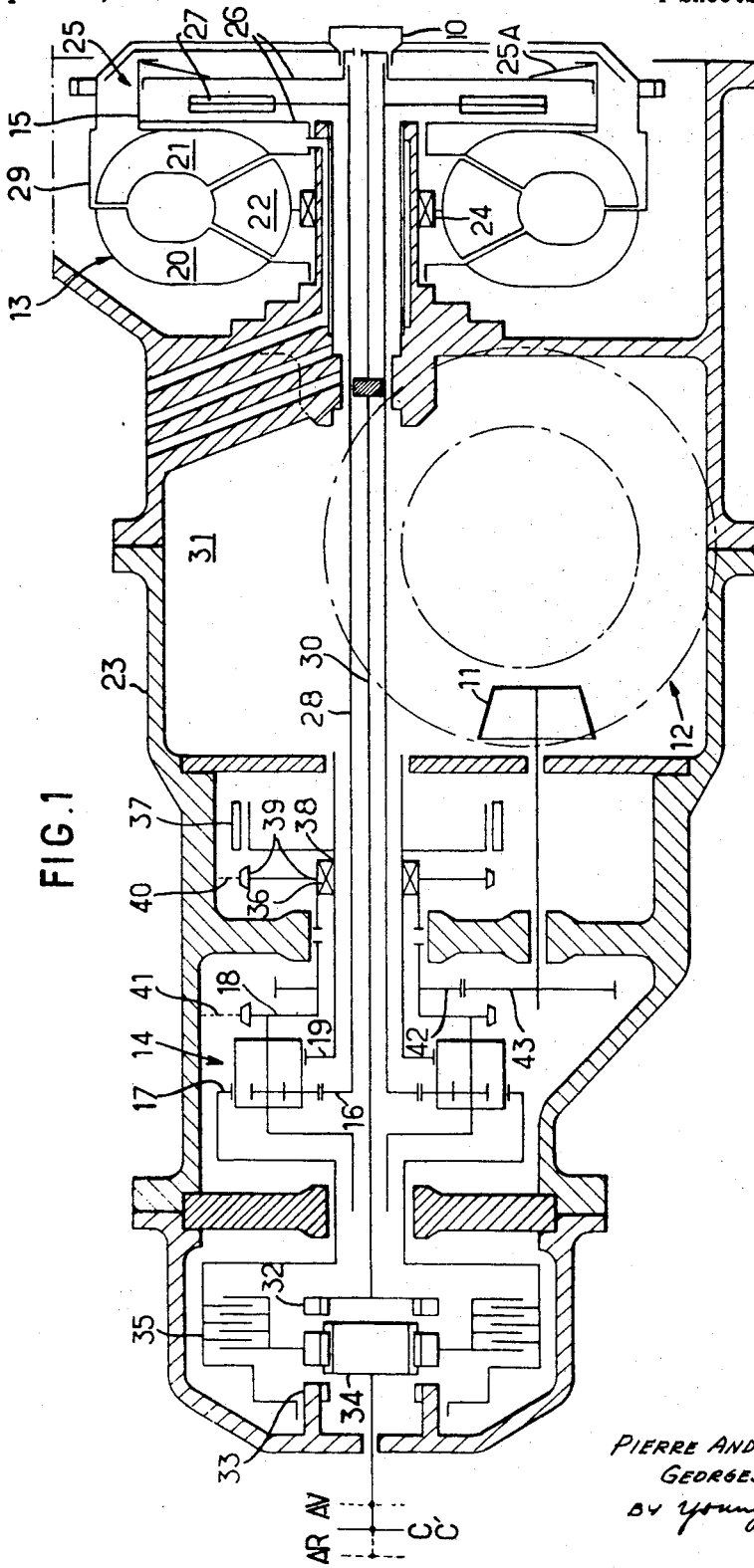
FIG. 1 is a diagrammatic view in longitudinal section of a transmission for an automobile vehicle according to the invention.

Reference will first be made to FIGS. 1 to 4. A transmission for an automobile vehicle comprises (FIG. 1) between the crank-shaft 10 of the engine and the driving pinion 11 of the bevel-gear 12 forming the axle of the driving wheels, on the one hand a kinetic coupling device of the type which is at least partly disengaged during idling, for example a device responsive to centrifugal force such as a hydraulic torque converter 13, and on the other hand trains of pinions 14 forming the gear-box and referred to as such in the text which follows, the said gear-box 14 having two inputs driven from a movement take-off 15 from the output of the converter 13, the take-off driving the pinion 11. The gear-box 14 comprises four elements 16, 17, 18 and 19, which are coupled to each other by planetary gear means and which cooperate both with releasable coupling means to the movement take-off 15 and also with releasable immobilizing means. These various means are described in more detail later.

The first element 16 is the so-called releasable input element and is intended to be either driven by the movement take-off 15 or free.

The second element 17 is known as the mixed element and is designed to be either driven by the movement take-off, or immobilized, or free.

The third element 18 is the so-called output element and is permanently coupled to the pinion 11.

The fourth element 19 is the so-called releasable reaction element and is intended to be either immobilized or free.

The gear-box 14 has a neutral position, three forward gears and one reverse gear. The table given below shows the respective conditions of the first three elements necessary to make these gears operative.

|  | Releasable input element 16 | Mixed element 17 | Releasable reaction element 19 |
|---|---|---|---|
| First forward running gear | Driven | Free | Immobilized. |
| Second forward running gear | Free | Driven | Do. |
| Third forward running gear, direct drive | Driven | do | Free. |
| Reverse-running gear | do | Immobilized | Do. |

The hydraulic torque converted 13 comprises an impeller wheel 20 which is fixed for rotation with the driving shaft 10, a turbine wheel 21 which forms the movement take-off 15, and a reactor wheel 22 which is coupled to the fixed frame 23 through the intermediary of a free-wheel 24.

A first clutch 25, operating by oil pressure, comprises clamping plates 26 which are fixed for rotation to the movement take-off 15, and a friction disc 27 which is intended to be gripped between the plates 26 and which is coupled by a hollow shaft 28 to the first element 16 of the gear-box 14. Further details of the construction and operation of clutch 25 are to be found in U.S. Patent No. 3,213,988.

A clapper-valve 27A (FIG. 4) for the passage of oil through the friction disc 27, allows a smaller flow-rate of oil in the direction of passage towards the axis than in the direction of passage towards the periphery, so as to permit progressive engagement and rapid declutching. This structure and its operation are further discussed in the above-identified patent.

A calibrated Belleville washer 25A, or any other similar elastic means (FIG. 1) ensures at the same time, in the absence of any oil pressure, a pre-determined gripping effect of this clutch.

The washer 25A and the limiting device 37 enable the engine to be started-up by driving by the vehicle when the latter is moved. This starting is possible on all forward gears and even in neutral. In this latter case in particular, the starting-up is effected in first gear, and as soon as the engine has started, the gear-box returns automatically to neutral with the converer declutched, the establishment of the pressure having caused the disengagement of the first clutch. There is thus obtained a highly desirable condition of safety, while at the same time the user is allowed freedom to operate differently if he considers this useful or without risk.

The first clutch 25 is arranged axially on the side of the converter 13 which is opposite to the gear-box 14. The clutch 25 is arranged in juxtaposition to the turbine 21 and is mounted inside a chamber 29 which is filled with oil and which contains the converter 13. It will be noted that the bevel gearing which forms the driving axle 12 is arranged axially between the converter 13 and the gear-box 14.

A second clutch 35, which may be a multi-disc clutch, is arranged axially opposite to the converter 13 with respect to the gear-box 14, and also operates by oil pressure. The part of this clutch which has the greatest inertia is rigidly fixed to the element 17, while the part which has the lowest inertia is intended to be coupled, either to the movement take-off 15 in order to obtain the second and third forward gears, or to the mixed frame in order to change the gear to reverse running.

To this end, a shaft 30 extends into the interior of the hollow shaft 28, and the two shafts 28 and 30 pass through the compartment 31 of the transmission which receives the axle 12.

The shaft 30 is fast for rotation with the movement take-off 15 and carries at its end, beyond the gear-box 14, a set of teeth 32 known as the forward-running teeth, of a double dog-clutch 32, 33 and 34, which further comprises another set of teeth 33, known as the reverse running teeth, which is coupled to the fixed frame, and a sliding gear 34. The latter is keyed on the portion of the clutch 35 which has the lowest inertia, and is adapted to be engaged at will either with neither or with one or the other of the two sets of teeth 32 and 33.

The teeth 32 and the sliding gear 34 constitute coupling means adapted to drive the element 17 for forward running by the movement take-off 15, in co-operation with the clutch 35. The sliding gear 34 is intended to be engaged with the teeth 32 for all the forward gears, and to be disengaged from these teeth once and for all, for the reversing gear and in the neutral position. It is designed to be engageable with the teeth 32 when the vehicle is stopped, and to act fully or not at all with respect to these teeth 32, without thereby causing either a failure of operation or undesirable shocks.

In the same way, the teeth 33 and the sliding gear 34 form immobilization means adapted to immobilize the element 17 on reverse running in co-operation with the clutch 35. The sliding gear 34 is intended to be engaged with the teeth 33 for the reverse gear and to be disengaged from these teeth once and for all, for all the forward gears and for the neutral position. It is adapted to be engageable with the teeth 33 when the vehicle is stationary and to act fully or not at all with respect to these teeth 33, without thereby causing either failure of operation or undesirable shocks.

The element 19 co-operates with immobilization means which are adapted to immobilize it both in the first and second forward running gears and which are therefore common to these two gears. These immobilization means comprise on the one hand a free-wheel 36 and on the other hand a calibrated force-limiting device 37 which can be elastically gripped and released with respect to the frame. The free-wheel 36 has one of its parts 38 coupled to the element 19, while its other part 39 which is of low inertia is associated with a locking member 40. This free-wheel 36 forms a lock for the direction of forward passage of the torque when the member 40 is operative.

The member 40 consists, as shown in FIGS. 1 and 3, of a mechanical dog-clutch engaging finger with a knuckle-joint or acting by pressure or the like, and is intended to be engaged once and for all, for all the forward-running gears and to be disengaged for the reverse-running gear and for the neutral position. The member 40 is intended to be operated when the vehicle is stationary and to act fully or not at all without thereby resulting in either failure of operation or undesirable shocks.

The limiting device 37 which is of the band type 74 (FIG. 6) is subjected to a calibrated spring 75 co-operating with a piston 76. The latter defines two opposite hydraulic chambers 77 and 78 of substantially equal sections. The limiter 37 operates as follows:

When the pressures at 77 and 78 are absent or are simultaneously present and equal, only the spring 75 is operative and the limiter is in the gripped position under a pre-determined calibration. The release of the limiter 37 is effected by admission of the pressure to one side 78 only, opposite to the spring 75.

The limiting device 37 is intended to be held elastically gripped during the operations of the double dog-clutch 32, 33 and 34.

The output element 18 (FIGS. 1 to 4) is associated with a locking or so-called parking member 41 which can be used to immobilize the vehicle when stationary. Like the member 40, the member 41 consists of a mechanical finger engaging the dog-clutch, having a knuckle-joint or acting by pressure or the like, operating either wholly or not at all.

The output element 18 is rigidly fixed to a toothed wheel 42 which engages with a further toothed wheel 43, fixed to the driving pinion 11.

In the example shown in FIG. 1, the gear-box 14 is of the type having two sets of planet wheels engaging with each other, as shown in the perspective diagram of FIG. 2.

The first element 16 is a sun wheel which engages at 44 with a satellite pinion 45 known as a short satellite, while the fourth element 19 is another sun wheel which engages at 46 with another satellite pinion 47, known as a long satellite.

The two satellite pinions 45 and 47 are carried by the third element 18 forming a satellite carrier and engage with each other at 48.

The second element 17 is a crown wheel which engages at 49 with the long satellite 47.

In practice, the satellite-carrier 19 carries not only a satellite pinion 45 and a satellite pinion 47, but a set of satellites 45 and a set of satellites 47.

Good results have been obtained with the following numbers of teeth for the various parts of the gear-box:

|  | Teeth |
| --- | --- |
| Sun wheel 16 | 29 |
| Sun wheel 19 | 37 |
| Crown wheel 17 | 87 |
| Short satellite pinion 45 | 27 |
| Long satellite pinion 47 | 25 |

There are thus obtained the following gear ratios for the various gears:

| First forward gear | 0.438 |
| --- | --- |
| Second forward gear | 0.702 |
| Third forward gear | 1.000 |
| Reverse gear | 0.500 |

With a bevel gear at 42, 43 having a slight step-up ratio such as for example:

|  | Teeth |
| --- | --- |
| Toothed wheel 42 | 27 |
| Toothed wheel 43 | 23 |

The following overall ratios can be obtained between the movement take-off 15 and the pinion 11:

| First forward gear | 0.515 |
| --- | --- |
| Second forward gear | 0.825 |
| Third forward gear | 1.174 |
| Reverse gear | 0.587 |

A control, which will be described later with reference to FIG. 6, makes it possible to obtain a parking point P$k$, a neutral point PM, a first forward gear point AV1, a second forward gear point AV2, a third forward gear point AV3, and a reverse point AR, under conditions of operation which are indicated in the following table.

second clutch 35 are disengaged and the limiting device 37 is gripped. Under these conditions, the four elements 16, 17, 18 and 19 of the gear-box 14 are all immobilized on two of them, namely the element 18 coupled to the driving wheels and the element 19 gripped by the limiting device.

The turbine 21 rotates freely and the teeth 32 of the double dog-clutch 32, 33, 34 rotate therewith. The two parts of the free-wheel 36 are stationary, as is also the sliding gear of the double dog-clutch, for the simultaneous reason of the low inertia of these parts and of the absence of any positive action tending to drive them.

When leaving the neutral position, and before any movement of mechanical engagement of the dog-clutch, the first clutch 25 is engaged. The turbine 21 and the teeth of the double dog-clutch 32, 33, 34 are immobilized in their turn, the limiting device 37 acting as a drag-brake. It will here be observed that by virtue of the limiting device 37, the shock during stopping which is sometimes observed in transmissions comprising a coupler or a torque converter during the engagement of the gears, is considerably reduced or even completely eliminated, especially if supplementary action is taken on the direction of winding of the band in order still further to reduce its capacity at that moment.

The sliding gear 34 being keyed on the low inertia portion of the second clutch 35, which is still disengaged, and the two parts of which are stationary or rotating slowly in the event of slip of the limiter 37, there is no difficulty of passage, either for the engagement or disengagement of the dog-clutch, and this is equally true for forward or reverse running of if this clutch is of the dry type or the oil type, even in very cold weather. For its part, the finger 40 associated with the free-wheel 36, the two parts of which are similarly always stationary or rotating slowly, can be easily operated for the purpose of its engagement or its release, whether there is a load or not during one of these operations. Satisfactory operation is thus obtained with a small number of light parts and with advantages such as the arrangement combining the gear-box with a driving axle and the elimination of power loss by inertia or by stray friction.

In the example shown in FIG. 1, the various members of the transmission are coaxial, and the order along the axis in which these various members are arranged is as follows: first clutch 25, torque converter 13, driving axle 12, free-wheel assembly 36, force limiting device 37, locking member 40, parking finger 41, gear-box 14, second clutch 35, double dog-clutch 32, 33, 34.

Reference will now be made to FIG. 5, in which the arrangement is similar to that which has just been described with reference to FIGS. 1 to 4, and the same reference numbers have been employed to designate similar elements.

In FIG. 5 however, the first clutch 25, the kinetic apparatus 13, the second clutch 35, and the double dog-

| | Vehicle stopped, engine stopped | Vehicle stopped or running, engine running | | | | |
| --- | --- | --- | --- | --- | --- | --- |
| | Parking, Pk | Reverse, AR | Neutral position, PM | First forward speed, AV1 | Second forward speed, AV2 | Third forward Speed, AV3 |
| 1st clutch, 25 | Elastically gripped | Engaged | Released | Engaged | Released | Engaged. |
| 2nd clutch, 35 | Released | do | do | Released | Engaged | Do. |
| Dog-clutch forward, 34, 32 | Free | Free | Free | Engaged | do | Do. |
| Dog-clutch reverse, 34, 33 | do | Engaged | do | Free | Free | Free. |
| Force limiter, 37 | Elastically gripped | Released | Elastically gripped | Elastically gripped | Elastically gripped | Released. |
| Free-wheel locking member, 40 | Free | Free | Free | Engaged | Engaged | Engaged. |
| Parking finger, 41 | Engaged | do | do | Free | Free | Free. |

It will be noted that the passing of the sliding gear 34 of the dog-clutch over the teeth 32 or over the teeth 33 is carried out when the vehicle is stationary, and is not affected by the drag-torque which may be applied to the shafts 28 and 30 by the oil-filled chamber 29 of the converter 13 and/or the clutch 25. In fact, at the neutral position and when stopped, the first clutch 25 and the clutch 32, 33, 34 are coaxial along the axis of the shafts 28 and 30, while the gear-box 14, the free-wheel assembly 36, the force limiting device 37, the locking member 40′ and the parking finger 41 are coaxial with the axis of the pinion 11 which is spaced apart from and parallel to the axis of the shafts 28, 30, the order of their positions along an axial direction being: first clutch 25, kinetic apparatus 13, driving axle 12, gear-box 14, free-wheel assembly 36, limiting device 37, locking member 40′, second clutch 35 and double dog-clutch 32, 33, 34.

In addition, the gear-box 14, the four elements of which are again seen at 16, 17, 18 and 19, is again of the planetary gear type but is different from that which is shown in FIG. 2.

The first element 16 is driven by the hollow shaft 28 of the friction disc 27 of the first clutch 25 through the intermediary of a bevel pinion 50. The second element 17 is driven by the main inertia portion of the second clutch 35 through the intermediary of another bevel pinion 51.

The planetary gear system of the gear-box 14 is double and comprises two single identical planetary portions, each having a sun wheel, a crown wheel and a satellite-carrier, and being coupled in a symmetrical manner by the satellite-carrier of one being fixed to the crown ring of the other and vice-versa.

The sun wheel 52 of the first system is rigidly fixed to the first element 16. The satellite-carrier 55 of the first system and the crown wheel 56 of the second system are rigidly fixed to each other and to the second element 17. The satellite-carrier 54 of the second system and the crown wheel 53 of the first system are fixed to each other and to the third element 18. The sun wheel 57 of the second system is rigidly fixed to the fourth element 19.

Good results have been obtained with the following numbers of teeth:

| | Teeth |
|---|---|
| Pinion 50 | 28 |
| Pinion 16 | 22 |
| Pinion 51 | 27 |
| Pinion 17 | 23 |
| Sun wheel 52 or 57 | 26 |
| Crown wheel 53 or 56 | 54 |
| Each satellite | 14 |

There are thus obtained the following overall gear ratios for the various gears between the movement take-off 15 and the pinion 11:

| | |
|---|---|
| First forward gear | 0.513 |
| Second forward gear | 0.792 |
| Third forward gear | 1.126 |
| Reverse gear | 0.613 |

It will also be seen from FIG. 5 that the locking member associated with the free-wheel 36 does not consist of a finger 40, but of a brake 40′ actuated by oil pressure.

Figure 6:
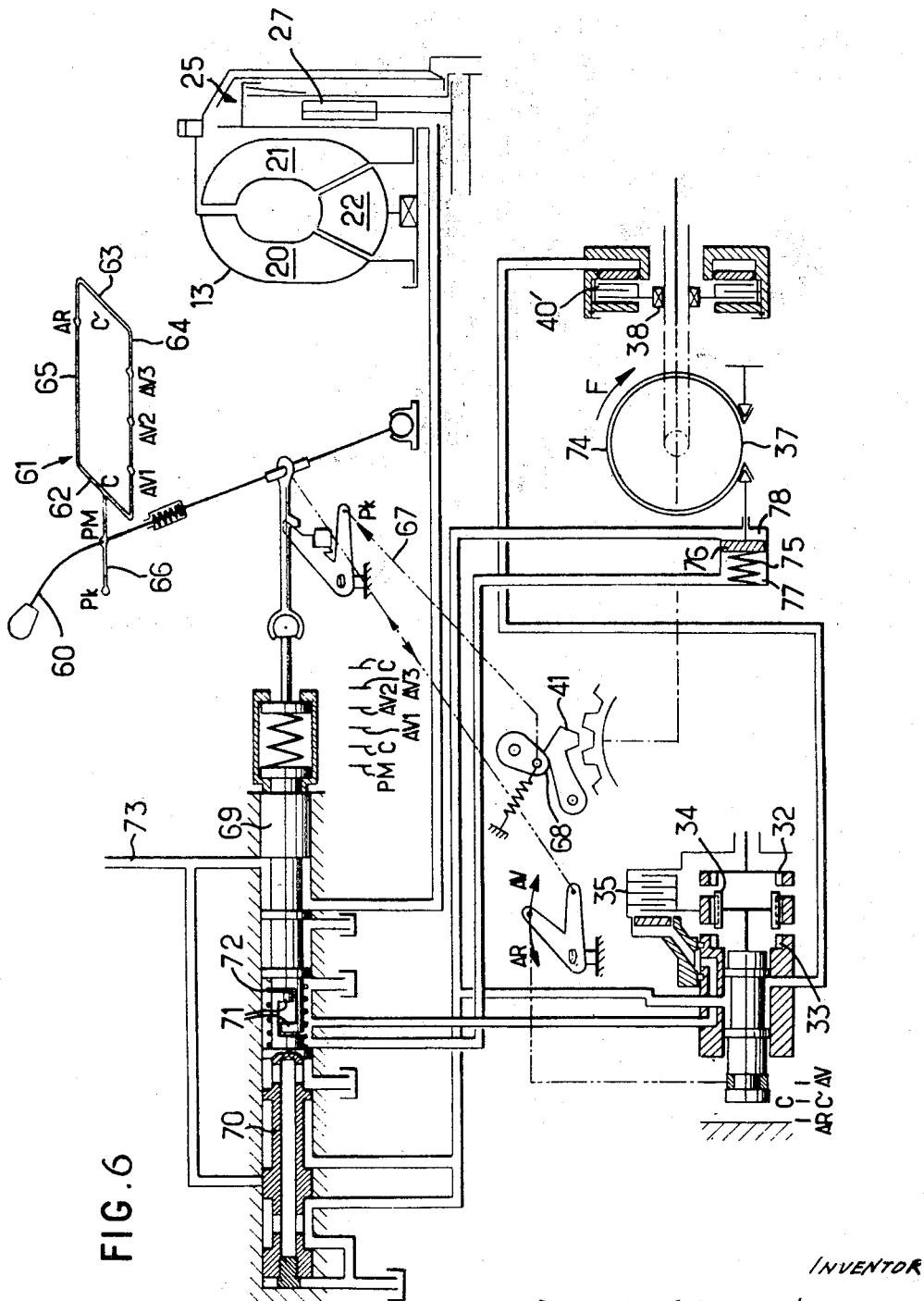
FIG. 6 shows a diagrammatic view of a control of the transmission of FIG. 1 or FIG. 5.

Reference will now be made to FIG. 6, which shows diagrammatically a control system for the transmission of FIG. 1 or FIG. 5, and more particularly for the transmission of FIG. 5 with the locking member 40′ in the form of a hydraulically-operated brake.

As seen in FIG. 6, the transmission is controlled by a small lever 60 moving inside a grid 61 having the form of a rectangle with sides 62, 63, 64, 65, preceded by a straight portion 66. The part 66 comprises the parking point P$k$ and the neutral position PM. The two opposite sides of the rectangle 62 and 63 form two dog-clutch position C and C′, in each of which the dog-clutch 34 is actuated. One of the other opposite sides of the rectangle comprises the three forward running points AV1, AV2, AV3 for the side 64, and the reverse running point AR for the side 65.

The control means shown in FIG. 6 consist, in addition to the parking control 41 comprising a link-rod system 67 and a locking device 68, of a system of two valves, or slide-valves, or rotary switches, or any other appropriate form, the first 69 of which controls the first clutch 25 mounted in the chamber of the converter 13 and the second 70 controls the members of the gear-box 14.

In the example shown in FIG. 6, the control comprises a system of two slide-valves 69 and 70, coupled to each other by a latching system 71 which allows them to have a limited relative movement against the action of a coupling spring 72, and occupying both in the parking position P$k$ and in the neutral position PM, the position shown in FIG. 6 in which these two slide-valves are in abutment against each other at their extremities and also one on the other.

As soon as the engine is started-up on one or the other of these two positions, the pressure is established in the first clutch 25 by the first slide-valve 69 which ensures the connection to a general pressure supply source 73, while the second slide-valve 70 opposes the arrival of the pressure to the members of the gear-box 14, which members are maintained in direct connection with the drain tank and without pressure.

There is thus obtained the condition in which the engine is running, the first clutch 25 is disengaged, the gear-box 14 is in the neutral position, the force-limiting device 37 gripped by the spring 75. In these circumstances and when the vehicle is stationary, all the elements of the gear-box 14 are immobilized on two of them, namely the output element 18 and the releasable reaction element 19 subjected to the action of the force-limiting device 37. The turbine 21 rotates freely and with it rotates the set of teeth 32 of the double dog-clutch 32, 33, 34, while the two parts of the free-wheel 36 and the sliding gear 34 are on the contrary, stopped.

Leaving the neutral position PM in the direction of the front side 64 or rear side 65, the position C is first encountered. Over the travel PM to C, only the first slide-valve 69 accompanies the control lever 60, the second slide-valve 70 remaining without variation in the position previously occupied on parking and in neutral. However, the limited movement of the two slide-valves 69 and 70 and the action of the coupling spring 72 are so chosen that from the position C and beyond, up to the position C′, the movement of the second slide-valve 70 by the first slide-valve 69 becomes positive, and this remains true for both directions of movement.

During this first movement PM–C, the gear-box thus remains in neutral without change, the force-limiting device 37 being gripped, while the first slide-valve 69 cuts-off the connection between the first clutch 25 and the general pressure supply 73 and puts the clutch 25 to the drain tank.

The first clutch 25 is thus engaged, and thereby the turbine 21 is immobilized, together with the teeth 32 of the double dog-clutch 32, 33, 34. It will be observed that, by means of the force-limiting device 37, the shock when stopping which sometimes occurs in transmissions comprising a coupler or torque converter during the engagement of the gears is reduced or even completely eliminated, especially if supplementary action is taken on the direction of winding of the band 74 employed in the limiter 37 (arrow F) in order to reduce the capacity of the force-limiting device 37 at this moment.

It will also be noted that the retarded passage of the oil through the clapper-valve 27A of the friction-disc 27 of the first clutch 25, provided to produce a gentle modulation in all cases of re-engagement of the clutch, adds its effect at that moment to that of the force-limiting device 37 and of the change in direction of operation of the band 74.

As the sliding gear is keyed on the low inertia portion of the second clutch 35, which is still disengaged and the two parts of which are stationary or rotating slowly in the event of slip of the limiting device 37, no difficulty of operation is caused either for engagement or disengagement of the double-dog-clutch 32, 33, 34 towards the forward-running side 64 or the reverse running side 65, whether the clutch is of the air type or of the oil type, even in extremely cold weather.

In the form of construction in which the locking member of the free-wheel 36 consists of a mechanical finger 40 (see FIGS. 1 and 3), this finger can be easily actuated by means of a rod system with locking for the purpose of its engagement or disengagement, exactly like the parking finger 41, whether these operations are carried out under load or not.

When these operations have once been effected, the simultaneous movement of the two slide-valves 69 and 70 actuates successively the first, second and third forward gears on the front section 64 and the reverse gear on the rear section 65, in accordance with the conditions of operation indicated in the table given above. In addition, in order to offer additional ease of driving to the user, a second dog-clutch engagement position C' is provided at 63, at the other end of the grid 61, on which the first clutch 25 is engaged and the gear-box 14 is in neutral as on the position C. When the vehicle is stationary, the user can thus utilize this position C' in the same way as the position C, for the forward or reverse operations of the dog-clutch, and in exactly the same conditions as those which have already been described for C.

Satisfactory operation is thus obtained with an extremely small number of light parts to be actuated and controlled, and with advantages such as the arrangement of the gear-box combined with the driving axle, the facility of choice of gear ratios, the elimination of the major part of the power losses usually encountered with this type of construction, due to inertia or stray friction, and especially in first gear on which depends the maximum acceleration achieved by the vehicle, in third gear, on which the maximum speed depends, without prejudice to the second gear, on which the efficiency is just as good, and which provides a compromise ratio for the purpose of driving in town traffic by means of the torque converter alone.

It should be noted that the first clutch 25 can be mounted axially, either on the side of the kinetic apparatus which is opposite to the gear-box, or between the said kinetic apparatus and the gear-box, or between the gear-box and the second clutch 35.

What I claim is:

1. In a transmission for automobile vehicles having an engine and driving wheels, comprising between the engine and the driving wheels a kinetic coupling device which is at least partly disengaged at idling speeds and a ratio-changing device, said ratio-changing device comprising a fixed frame, a movement input driven by said kinetic coupling device, a movement output driving said wheels, and a planetary gear train having four elements of the type including a first element having control means by which it can be either coupled to said movement input or free; a second element having control means including two clutches by which it can be either coupled to said movement input, or immobilized on the frame, or free; a third element permanently coupled to the movement output; and a fourth element having control means by which it can be either immobilized on the frame, or free; the improvement wherein said control means of said fourth element comprise one-way brake means and two-way brake means selectively engageable between the fixed frame and said fourth element, said two-way brake mans comprising spring-applied force limiting means.

2. A transmission as claimed in claim 1, said one-way brake means being of higher capacity than said two-way brake means and having a unidirectional connection operatively inserted between said one-way brake means and said fourth element.

3. A transmission as claimed in claim 2, wherein said one-way brake means comprises a rotatable member connected with said fourth element through said unidirectional connection and a finger means connected with said frame and selectively engaging said member.

4. A transmission as claimed in claim 1, wherein said one-way brake means is a hydraulic brake.

5. A transmission as claimed in claim 1, wherein one of said two clutches of said control means of said second element comprises two coaxial spaced toothed members a first of which is connected with said movement input while the second is fixed to said frame, a third toothed member axially arranged between said first and second members and selectively engageable with either of the last-named members, and the other of said two clutches being operatively inserted between said third toothed member and said second element.

6. A transmission as claimed in claim 1, and a parking finger means connected with said frame and selectively engageable with said third element.

7. A transmission as claimed in claim 1, wherein said kinetic coupling device includes hydralically cooperating impeller and turbine wheels, said impeller wheel being driven by said engine, said turbine wheel forming said movement input, said control means of said first element comprising a clutch means operatively inserted between said turbine wheel and said first element.

8. A transmission as claimed in claim 1, wherein said kinetic coupling device includes hydraulically cooperating impeller and turbine wheels, said impeller wheel being driven by said engine, said turbine wheel forming said movement input, said control means of said first element comprising a clutch means operatively inserted between said turbine wheel and said first element, one of said two clutches of said control means of said second element comprising two coaxial spaced toothed members a first of which is connected with said movement input while the second is fixed to said frame, a third toothed member axially arranged between said first and second members and selectively engageable with either of the last-named members, the other of said two clutches being operatively inserted between said third toothed member and said second element, and wherein a location arrangement is provided in an axial order as follows: clutch means of said first element; kinetic coupling device; ratio-changing device and control means of said fourth element; and toothed members and clutch means of said second element.

9. A transmission as claimed in claim 8, wherein the driving wheels of the vehicle are driven from said third element through a bevel gearing, said bevel gearing being arranged between said kinetic coupling device and said ratio-changing device.

10. A transmission as claimed in claim 8, wherein said clutch means of said first element, said kinetic coupling device, said ratio-changing device, said control means of said fourth element and said toothed members and clutch means of said second element are coaxial.

11. A transmission as claimed in claim 8, wherein said clutch means of said first element, said kinetic coupling device and said toothed members and clutch means of said second element are coaxial with a first axis while said ratio-changing device and said control means of said fourth element are coaxial with a second axis which is spaced apart from and parallel to said first axis.

12. A transmission as claimed in claim 1, wherein said kinetic coupling device includes hydraulically cooperating impeller and turbine wheels, said impeller wheel being driven by said engine, said turbine wheel forming said movement input, said control means of said first element comprising a clutch means operatively inserted between said turbine wheel and said first element, one of said clutches of said control means of said second element comprising two coaxial spaced toothed members a first of which is connected with said movement input while the second is fixed to said frame, a third toothed member axially arranged between said first and second members and selectively engageable with either of the last-named members, the other of said two clutches being operatively inserted between said third toothed member and said second element, and wherein said clutch means of said first element, said other of said two clutches of said second element, said one-way brake means and said two-way brake means are hydraulically actuated and valve means responsive to a ratio-changing lever are provided to actuate said clutch and brake means, while a connection is provided between said lever and said third toothed member.

References Cited

UNITED STATES PATENTS

| | | | |
|---|---|---|---|
| 2,377,696 | 6/1945 | Kelley | 74—732 X |
| 2,406,225 | 8/1946 | Kelbel | 74—761 |
| 2,531,996 | 11/1950 | Voytech | 74—759 X |
| 2,737,824 | 3/1956 | Livermore | 74—761 X |
| 3,003,367 | 10/1961 | Winchell | 74—761 X |
| 3,090,256 | 5/1963 | Hause | 74—759 X |
| 3,095,764 | 7/1963 | Peras | 74—732 X |
| 3,292,454 | 12/1966 | Konrad et al. | 74—688 |

WILLIAM L. FREEH, Primary Examiner

THOMAS C. PERRY, Assistant Examiner

U.S. Cl. X.R.

74—695, 759, 761; 192—4